(12) United States Patent
Wang et al.

(10) Patent No.: US 10,911,844 B2
(45) Date of Patent: Feb. 2, 2021

(54) INTEGRATED HIGH-RADIX NON-BLOCKING OPTICAL SWITCHING FABRIC

(71) Applicant: The Hong Kong University of Science and Technology, Hong Kong (CN)

(72) Inventors: Zhifei Wang, Hong Kong (CN); Jiang Xu, Hong Kong (CN); Zhehui Wang, Hong Kong (CN); Peng Yang, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 240 days.

(21) Appl. No.: 16/090,073

(22) PCT Filed: Mar. 30, 2017

(86) PCT No.: PCT/CN2017/078808
§ 371 (c)(1),
(2) Date: Sep. 28, 2018

(87) PCT Pub. No.: WO2017/167231
PCT Pub. Date: Oct. 5, 2017

(65) Prior Publication Data
US 2020/0336807 A1   Oct. 22, 2020

Related U.S. Application Data

(60) Provisional application No. 62/390,529, filed on Apr. 1, 2016.

(51) Int. Cl.
*H04Q 11/00* (2006.01)
*H04B 10/80* (2013.01)

(52) U.S. Cl.
CPC ....... *H04Q 11/0005* (2013.01); *H04B 10/801* (2013.01); *H04Q 2011/0007* (2013.01)

(58) Field of Classification Search
None
See application file for complete search history.

(56) References Cited

U.S. PATENT DOCUMENTS

| 7,245,582 B1 * | 7/2007 | Roberts | H04J 14/0227 |
| | | | 370/217 |
| 7,378,938 B2 * | 5/2008 | Konda | H04Q 3/68 |
| | | | 340/2.22 |

(Continued)

FOREIGN PATENT DOCUMENTS

| CN | 102540345 A | 7/2012 |
| CN | 102645706 A | 8/2012 |

(Continued)

OTHER PUBLICATIONS

International Search Report for PCT Application No. PCT/CN2017/078808, dated Jun. 21, 2017, 3 pages.

(Continued)

*Primary Examiner* — David W Lambert
(74) *Attorney, Agent, or Firm* — Amin, Turocy & Watson, LLP

(57) ABSTRACT

The technology described herein is generally directed towards an integrated high-radix strictly non-blocking optical switching fabric, such as for use for intra-rack communication within racks in a data center. The fabric may be configured with any number of ports. A general topology of optical components, along with a routing controller (e.g., algorithm/mechanism), results in an optical switching fabric architecture that provides bidirectional routing, in a high-performance, high bandwidth, highly robust switching fabric that is also low in power consumption and low latency.

20 Claims, 12 Drawing Sheets

(56) References Cited

U.S. PATENT DOCUMENTS

| | | | |
|---|---|---|---|
| 8,260,147 B2 | 9/2012 | Scandurra et al. | |
| 8,285,789 B2 | 10/2012 | Abts et al. | |
| 8,326,148 B2 | 12/2012 | Bergman et al. | |
| 2006/0083460 A1* | 4/2006 | Tamil | H04L 47/2441 385/17 |
| 2009/0074414 A1* | 3/2009 | Miles | H04J 14/0227 398/75 |
| 2014/0056371 A1* | 2/2014 | Ji | H04J 14/0298 375/260 |
| 2014/0363160 A1 | 12/2014 | Gumaste et al. | |
| 2015/0037036 A1 | 2/2015 | Dress | |
| 2015/0125112 A1* | 5/2015 | Frankel | H04Q 11/0005 385/16 |
| 2016/0337731 A1* | 11/2016 | Graves | H04Q 11/0005 |

FOREIGN PATENT DOCUMENTS

| | | |
|---|---|---|
| CN | 103248578 A | 8/2013 |
| CN | 103941349 A | 7/2014 |
| CN | 103091784 B | 11/2014 |
| CN | 103308988 B | 4/2015 |
| CN | 105162721 A | 12/2015 |
| WO | 2016045716 A1 | 3/2016 |
| WO | 2016/149797 A1 | 9/2016 |

OTHER PUBLICATIONS

Xiao Shan Yu, et al. "The Optical Interconnection Network for Cloud Computing Data Centers: State of the Art and Future Research" Chinese Journal of Computers, vol. 38, No. 10, Oct. 31, 2015, 22 pages.

Jia et al., "5-port optical router based on Si microring optical switches for photonic networks-on-chip", IEEE Photonics Technology Letters, vol. 28, No. 9, May 1, 2016, pp. 1-4.

Tan et al., "A Generic Optical Router Design for Photonic Network-on-Chips", Journal of Lightwave Technology, vol. 30, No. 3, Feb. 1, 2012, pp. 368-376.

Gu et al., "A Low-Power Fat Tree-based Optical Network-on-Chip for Multiprocessor System-on-Chip", Proceedings of the Conference on Design, Automation and Test in Europe, 2009, 6 pages.

Min et al., "A Universal Method for Constructing N-Port Nonblocking Optical Router for Photonic Networks-On-Chip", Journal of Lightwave Technology, vol. 30, No. 23, Dec. 1, 2012, pp. 3736-3741.

Kim et al., "Flattened Butterfly Topology for On-Chip Networks", Proceedings of the 40th Annual IEEE/ACM International Symposium on Microarchitecture, 2007, pp. 172-182.

Yang et al., "Non-blocking 4x4 Electro-Optic Silicon Switch for On-Chip Photonic Networks", Optics Express, vol. 19, No. 1, Jan. 3, 2011, pp. 47-54.

Sherwood-Droz et al., "Optical 4x4 hitless slicon router for optical Networks-on-Chip (NoC)", Optics Express, vol. 16, No. 20, Sep. 29, 2008, pp. 15915-15922.

Nikolova et al., "Scaling silicon photonic switch fabrics for data center interconnection networks", Optics Express, vol. 23, No. 2, Jan. 26, 2015, pp. 1159-1175.

Chen et al., "Universal method for constructing N-port non-blocking optical router based on 2 × 2 optical switch for photonic networks-on-chip", Optics Express, vol. 22, No. 10, May 19, 2014, pp. 12614-12627.

Wang et al., "High-Radix Non-blocking Integrated Optical Switching Fabric for Data Center", Journal of Lightwave Technology, vol. 35, No. 19, Oct. 1, 2017, pp. 1-12.

Gu et al., "A Low-power Low-cost Optical Router for Optical Networks-on-Chip in Multiprocessor Systems-on-Chip", IEEE Computer Society Annual Symposium on VLSI, 2009, pp. 19-24.

Ye et al., "3-D Mesh-Based Optical Network-on-Chip for Multiprocessor System-on-Chip", IEEE Transactions on Computer-Aided Design of Integrated Circuits and Systems, vol. 32, No. 4, Apr. 2013, pp. 584-596.

Shacham et al., "Photonic Networks-on-Chip for Future Generations of Chip Multiprocessors", IEEE Transactions on Computers, vol. 57, No. 9, Sep. 2008, pp. 1246-1260.

Ye et al., "A Torus-Based Hierarchical Optical-Electronic Network-on-Chip for Multiprocessor System-on-Chip", ACM Journal on Emerging Technologies in Computing Systems, vol. 8, No. 1, Article 5, Feb. 2012, 26 pages.

Kim et al., "Flattened Butterfly: A Cost-efficient Topology for High-Radix Networks", Proceedings of the 34th Annual International Symposium on Computer Architecture, Jun. 9-13, 2007, 12 pages.

* cited by examiner

INTEGRATED HIGH-RADIX NON-BLOCKING OPTICAL SWITCHING FABRIC

CROSS REFERENCE TO RELATED APPLICATION

This application is a U.S. National Stage filing under 35 U.S.C. § 371 of international patent cooperation treaty (PCT) application No. PCT/CN2017/078808 filed Mar. 30, 2017, and entitled "INTEGRATED HIGH-RADIX NON-BLOCKING OPTICAL SWITCHING FABRIC", which claims priority to U.S. Provisional Application number 62/390,529, filed on Apr. 1, 2016, entitled: "INTEGRATED HIGH-RADIX NON-BLOCKING OPTICAL SWITCHING FABRIC," the entireties of which applications are hereby incorporated herein by reference.

TECHNICAL FIELD

This disclosure generally relates to optical switching, including for use in interconnections within data center racks.

BACKGROUND

Data services based on data centers, such as used in cloud computing, large data analysis and social network service environments are becoming well known in computing. To operate such data centers, powerful servers need to be interconnected in a way that provides for the rapid exchange of information between them. Relatively high bandwidth and energy efficient interconnections based on switch fabrics are in use, including for the intra-rack interconnections between servers. Such a switching fabric is generally a high-radix switching fabric that is able to support tens or even hundreds of interconnection ports.

Conventional electrical switches are reaching their usability limits for such switching fabrics, generally as a result of their relatively large latency and power dissipation. Silicon photonics devices are thus being investigated and used to some extent for switching fabrics because of their high data transmission and low power consumption for optical interconnections.

However, many of the known optical switching fabric topologies/architectures are either blocking structures or rearrangeable non-blocking structures, which suffer larger latency compared to strictly non-blocking ones (where strictly non-blocking refers to the ability to simultaneously use the paths from any input port to any output port). Some non-blocking optical switching fabric structures are known, however the losses in these structures are considerably large, making them incapable of being used as a high-radix optical switching fabric. Note that it is feasible to use relays in the optical links to reduce the losses in such structures, however relays consume power and have other negative impacts on the system, including introducing extra delay due to optical-electrical-optical conversions, and making chip fabrication more difficult.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards receiving, by a routing controller coupled to a strictly non-blocking optical circuit switching fabric, input comprising a source optical block and a destination optical block, the input requesting a coupling of the source input block to the destination output block to provide an optical signal path. Aspects include establishing, by the routing controller, the optical signal path from the source input block to the destination output block, comprising determining, based on a total number of ports of the strictly non-blocking optical circuit switching fabric and a first position of the source input block relative to a second position of the destination output block, a selected loop, whether to turn on the source input block or turn on the destination output block, and a respective on state or a respective off state of each optical switching element on the selected loop Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards an integrated high-radix strictly non-blocking optical switching fabric configurable with any (practical) number of ports, such as for use within racks in a data center. A general topology is provided by the technology, which, along with a routing controller (e.g., algorithm/mechanism), results in an optical switching fabric architecture that is extensible with respect to providing a desired number of ports. In general, the technology significantly reduces the optical devices through which optical signals need to pass to achieve bidirectional routing, (relative to other technologies). As will be understood, the high-performance, low-power interconnections of the technology result in ultra-high bandwidth and low latency intra-rack communication among tens or even hundreds of nodes, with low power consumption low loss and high robustness.

It should be understood that any of the examples herein are non-limiting. For example, implementations of the optical switching fabric may be shown as incorporated into a top of rack switch that interconnects a rack of servers, but this is only one beneficial use; indeed the optical switching fabric is neither limited to top of rack switches nor to server interconnections. As another example, various optical circuits comprising two crossbar-like loops (an inner loop and an outer loop) are exemplified herein, however optical circuits having more than two loops and/or different (e.g., stacked) configurations may achieve benefits from and be encompassed by the technology described herein. As such, the technology described herein is not limited to any particular implementations, embodiments, aspects, concepts, structures, functionalities or examples described herein. Rather, any of the implementations, embodiments, aspects, concepts, structures, functionalities or examples described herein are non-limiting, and the technology may be used in various ways that provide benefits and advantages in switching concepts in general.

Figure 1:
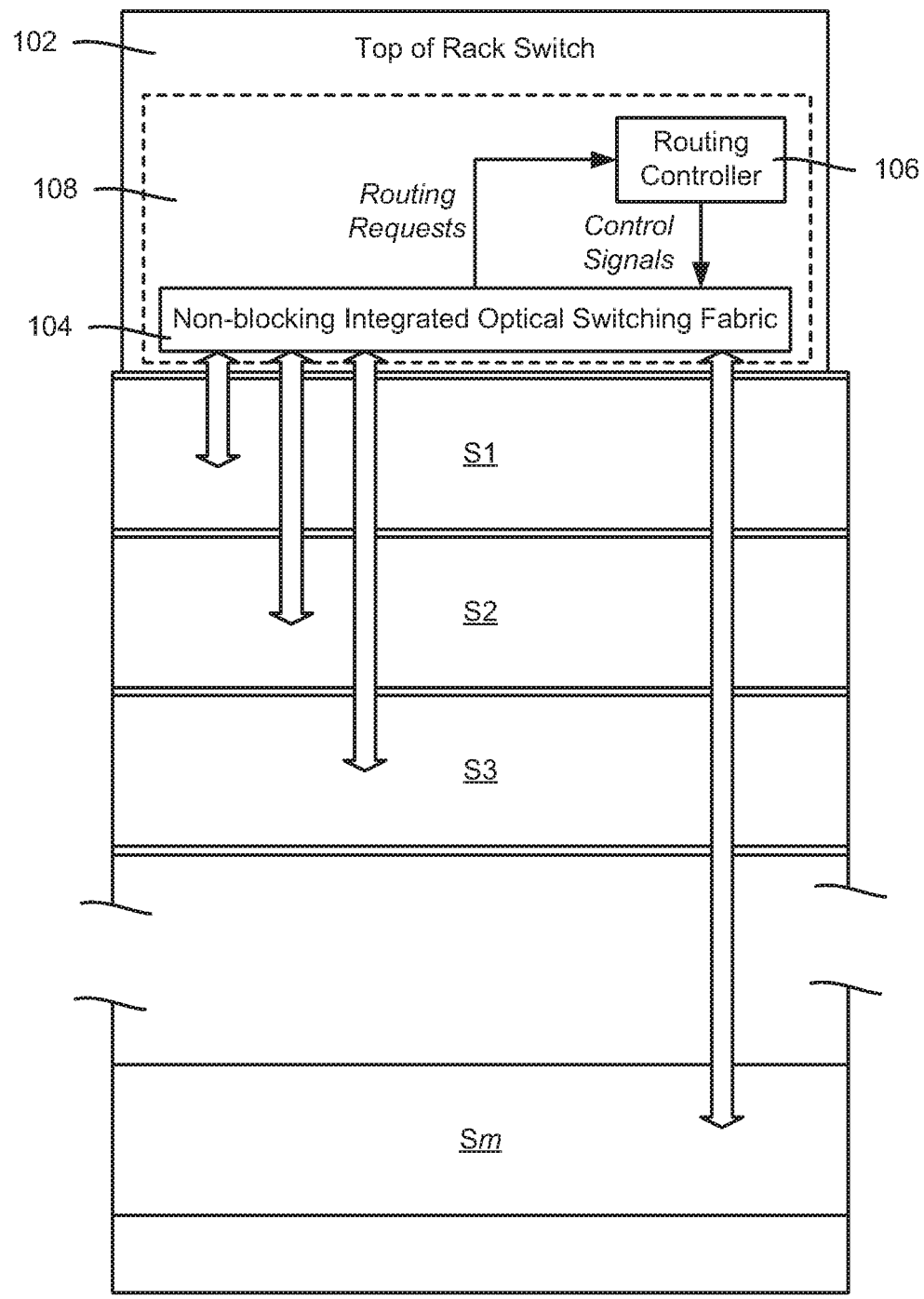
FIG. 1 is an example block diagram representation of a non-blocking integrated optical switching fabric that is used in a top of rack switch to interconnect servers in a server rack, according to one or more example implementations.

In general and as represented in the example of FIG. 1, a rack of servers S1-Sm is shown, with the servers S1-Sm being interconnected via a top of rack switch 102. The top of rack switch 102 comprises a non-blocking integrated optical switching fabric 104 and a routing controller 106 as described herein. As is understood, although generally shown as separate in FIG. 1, the routing controller 106 may be considered part of the non-blocking integrated optical switching fabric 104, as represented by the dashed block 108; for example, both may be fabricated together, e.g., in a single chip. Alternatively, the routing controller 106 may be coupled to the optical switching fabric 104 in any suitable way.

Figure 2:
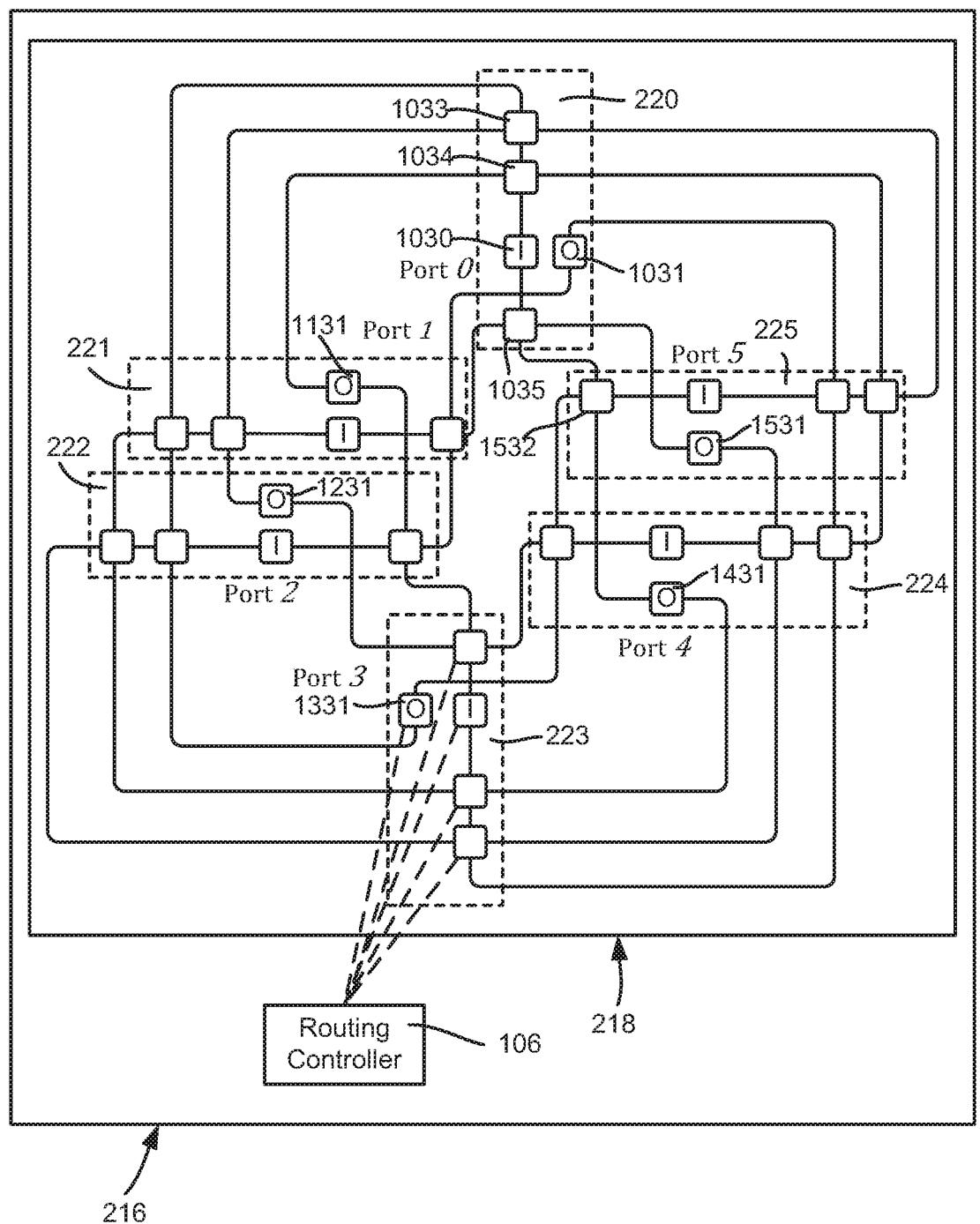
FIG. 2 is an example representation of the topology of a 6-port optical switching fabric of a non-blocking integrated optical switching fabric, according to one or more example implementations.

FIG. 2 exemplifies a 6-port optical switching fabric 216 comprising an optical network 218 and a routing controller 106. In FIG. 2, there are six clusters 220-225 (represented by dashed rectangles) corresponding to the six ports, in which each cluster comprises an input block (represented by the squares labeled with an "I"), an output block (represented by the squares labeled with an "O") and a plurality of optical switching elements (represented by unlabeled squares). In general, relevant ones of these components are connected with each other by waveguides.

The optical switching elements may comprise 2×2 optical switches, the input blocks may comprise 1×2 optical switches with optical pins (e.g., grating couplers, mirrors, prisms or the like), and the output blocks may comprise 2×1 optical switches with optical pins. More particularly, each pair of input and output blocks is bounded with a plurality of several optical switching elements in the radial direction, which are referred to as the optical switching elements of that input-output pair (or that input-output pair's cluster). For example, in FIG. 2, the input-output cluster 220 comprises an input-output pair (input block 1030, output block 1031) and the optical switching elements labeled 1033-1035; (note that for purposes of clarity, not all of the input blocks, output blocks and optical switching elements are individually labeled for the other clusters 221-225).

As represented in FIG. 2 by the dashed diagonal lines, the routing controller 106 controls the on and off states of each input block, output block and optical switching element. Although for purposes of clarity the dashed diagonal lines are only shown from the routing controller 106 to the input block, output block and optical switching elements of the cluster 223, it is understood that the routing controller 106 likewise controls the on and off state of each other input block, output block and optical switching element. By turning on or turning off these function blocks appropriately, optical signals from different inputs can be routed to different outputs simultaneously.

In one or more implementations, the optical network comprises two crossbar-like loops, within which the input and output ports are located. When viewed from the perspective of FIG. 2, an optical signal from any input block can be routed to a half of the output blocks via an inner loop clockwise, and to the other half of the output blocks via an outer loop counterclockwise. Note however that the term "half" is not exact, as an input block does not couple to its own paired output block; in other words, a U-turn is not supported, as it is meaningless to exchange information within a node by the switching fabric. Note that except with respect to the longest path on either the inner and outer loop, signal routing by the routing controller 106 needs to turn on one (and only one) optical switching element per path, along with turning on either the input block or output block.

Thus, in a 6-port switching fabric, any input block, referred to as a "source" input block may be coupled to a "destination" output block by the routing controller 106, wherein the destination output block is one of the five other possible output blocks (that is, other than the source input block's own paired output block). For example, optical signals from a source input block 1030 can be routed to destination output blocks 1431 and 1531 by selecting the inner loop, and can be routed to destination output blocks 1131, 1231 and 1331 by selecting the outer loop, but cannot be routed to output block 1031. No optical switching element needs to be turned on to route optical signals from the source input block 1030 to the destination output block 1331 or the destination output block 1431. Further, only the optical switching element 1034 needs to be turned on to route optical signals from the source input block 1030 to the destination output block 1131, and only the optical switching element 1033 needs to be turned on to route signals from the source input block 1030 to the destination output block 1231. Similarly, only the optical switching element 1035 needs to be turned on to establish a path from the source input block 1030 to the destination output block 1531.

Figure 3:
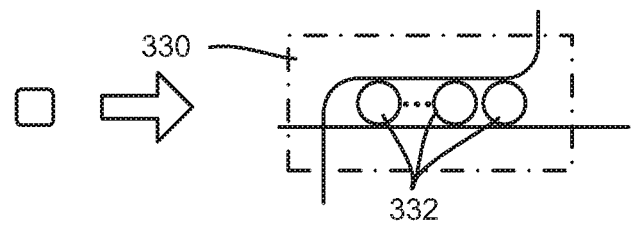
FIG. 3 is an example block diagram representation of an optical switching element, according to one or more example implementations.
Figure 4:
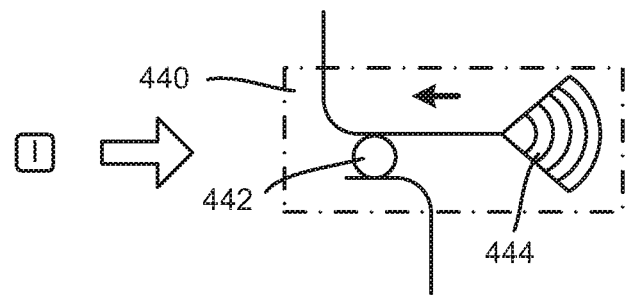
FIGS. 4 and 5 are example block diagram representations of an optical input block, according to one or more example implementations.
Figure 5:
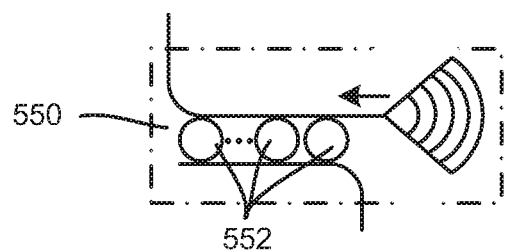
Figure 6:
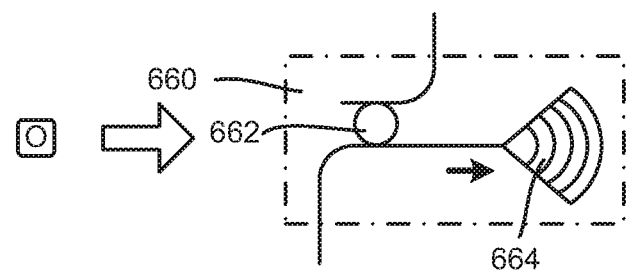
FIGS. 6 and 7 are example block diagram representations of an optical output block, according to one or more example implementations.
Figure 7:
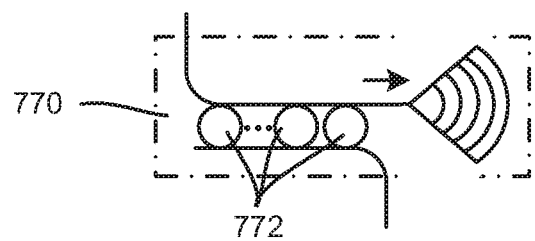

In one or more implementations, microresonators may be used to implement an optical switching element 330 (FIG. 3), in which the circles labeled 332 represent microresonators. An input block 440 or 550 (FIGS. 4 and 5, respectively) may use microresonators 442 or 552; an optical pin such as a grating coupler 444 is also shown in FIG. 4 as configured to receive optical signals. An output block 660 or 770 (FIGS. 6 and 7, respectively) may use microresonators 662 or 772; an optical pin such as a grating coupler 664 is shown in FIG. 6 as configured to output optical signals. In general, the optical pin in an input block couples light from optical fiber into the network, while the optical pin in the output block couples light from the network out to optical fiber.

Figure 8:
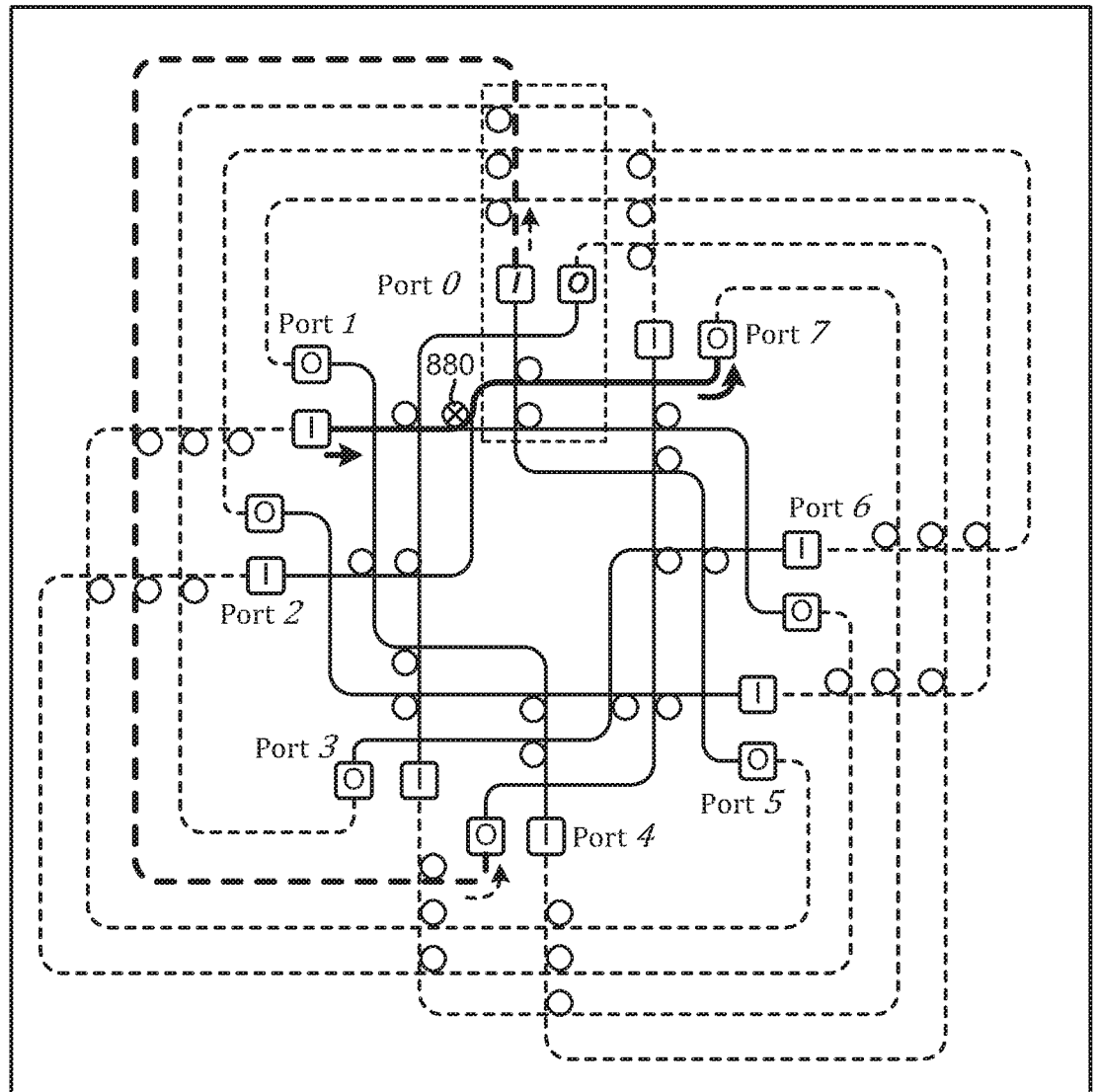
FIG. 8 is an example representation of the topology of an 8-port optical network of a non-blocking integrated optical switching fabric using single microresonators as optical switching elements to establish paths, according to one or more example implementations.

One microresonator, in which the optical switching elements are shown as circles in FIG. 8, (including the circle 880), is sufficient in these blocks for single wavelength operation. However, a microresonator group comprising multiple microresonators with different resonant wavelengths allows the use of the wavelength-division multiplexing (WDM) technique, which may provide advantages. Thus, as used herein, the terms "optical switching element," "input block" and "output block" include a single microresonator as well as a microresonator group for implementations that employ microresonators. Note however that the technology described herein is not limited to microresonators, and indeed, for example, Mach-Zehnder Interferometers (MZIs) may be utilized as optical switches as well; in other words, optical switching elements, input blocks and output blocks can be implemented with MZIs, and a network may have a combination of optical switch types. Further, an output block may be built with Y-branch combiners as well, (although they tend to introduce more insertion loss than microresonators). Moreover, the relative position of inputs and outputs may be exchanged, and thus the structures shown herein are only non-limiting examples.

Figure 9:
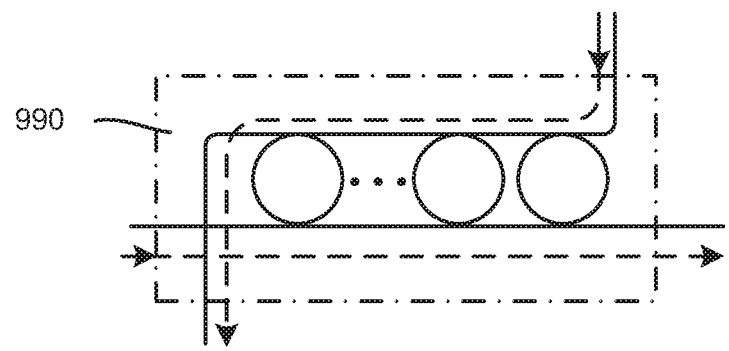
FIGS. 9 and 10 are example representations the off-resonant state (FIG. 9) and the on-resonant state (FIG. 10) of a microresonator group.
Figure 10:
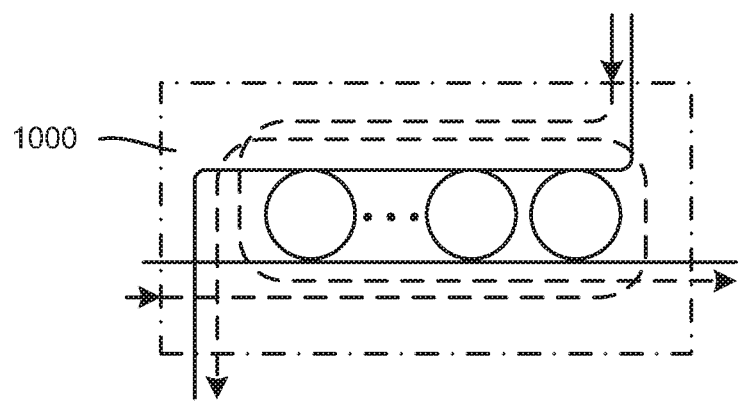

To turn on the optical switching elements, one technique with microresonators is to change the temperature of the microresonator in the optical switching element. Another is to inject a free carrier into the microresonator in the optical switching element to change the microresonator from off-resonance (as represented in FIG. 9, block 990) to on-resonance (as represented in FIG. 10, block 1000). These two switching methods may be referred to as thermal switching and carrier-injection switching, respectively. As is understood, when the state of a microresonator varies, the established optical signal path varies.

Figure 11:
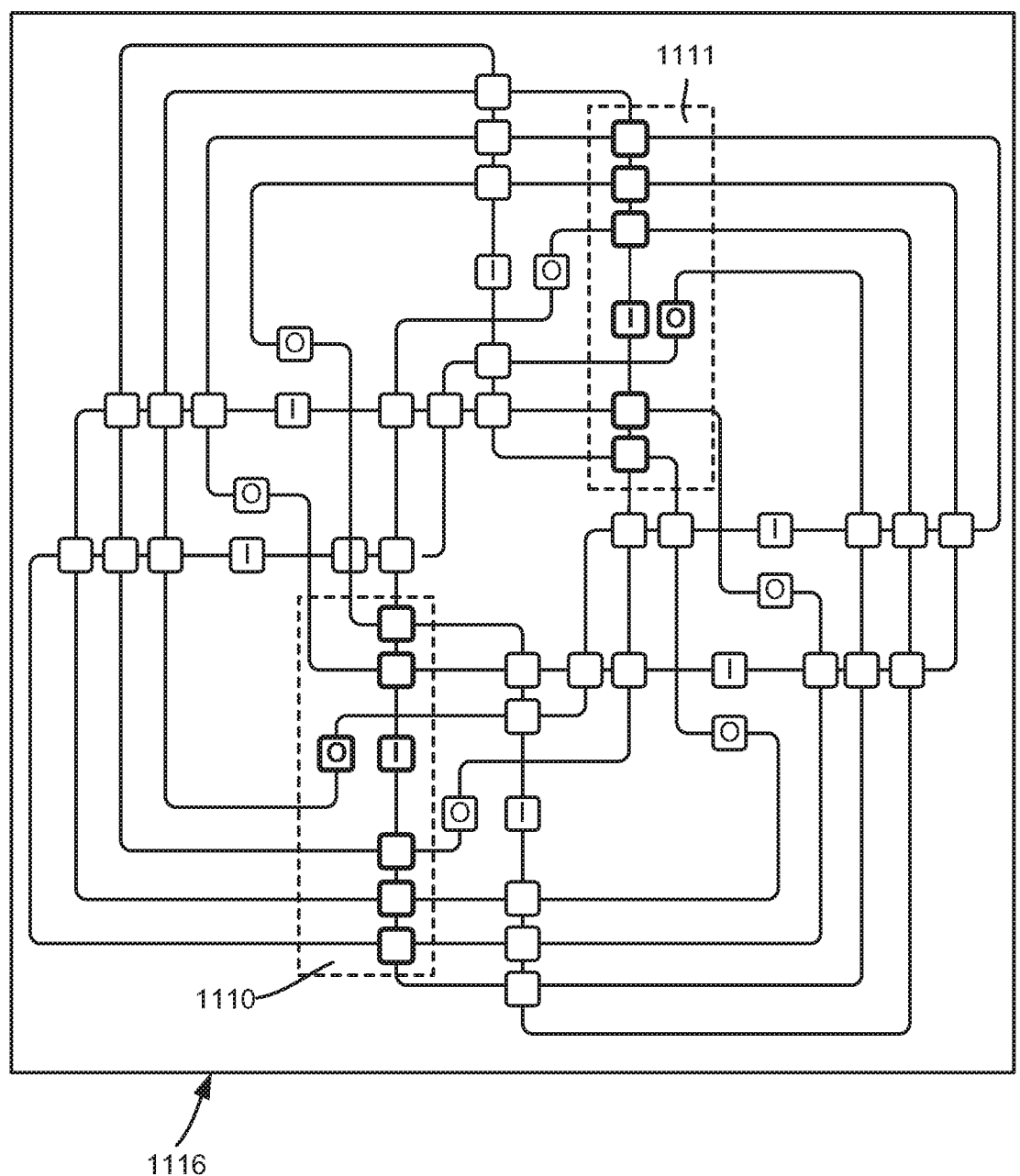
FIG. 11 is an example representation of the topology of an 8-port optical network of a non-blocking integrated optical switching fabric using one or more microresonators as optical switching elements, and also representing insertion of clusters to increase a number of ports, according to one or more example implementations.
Figure 12:
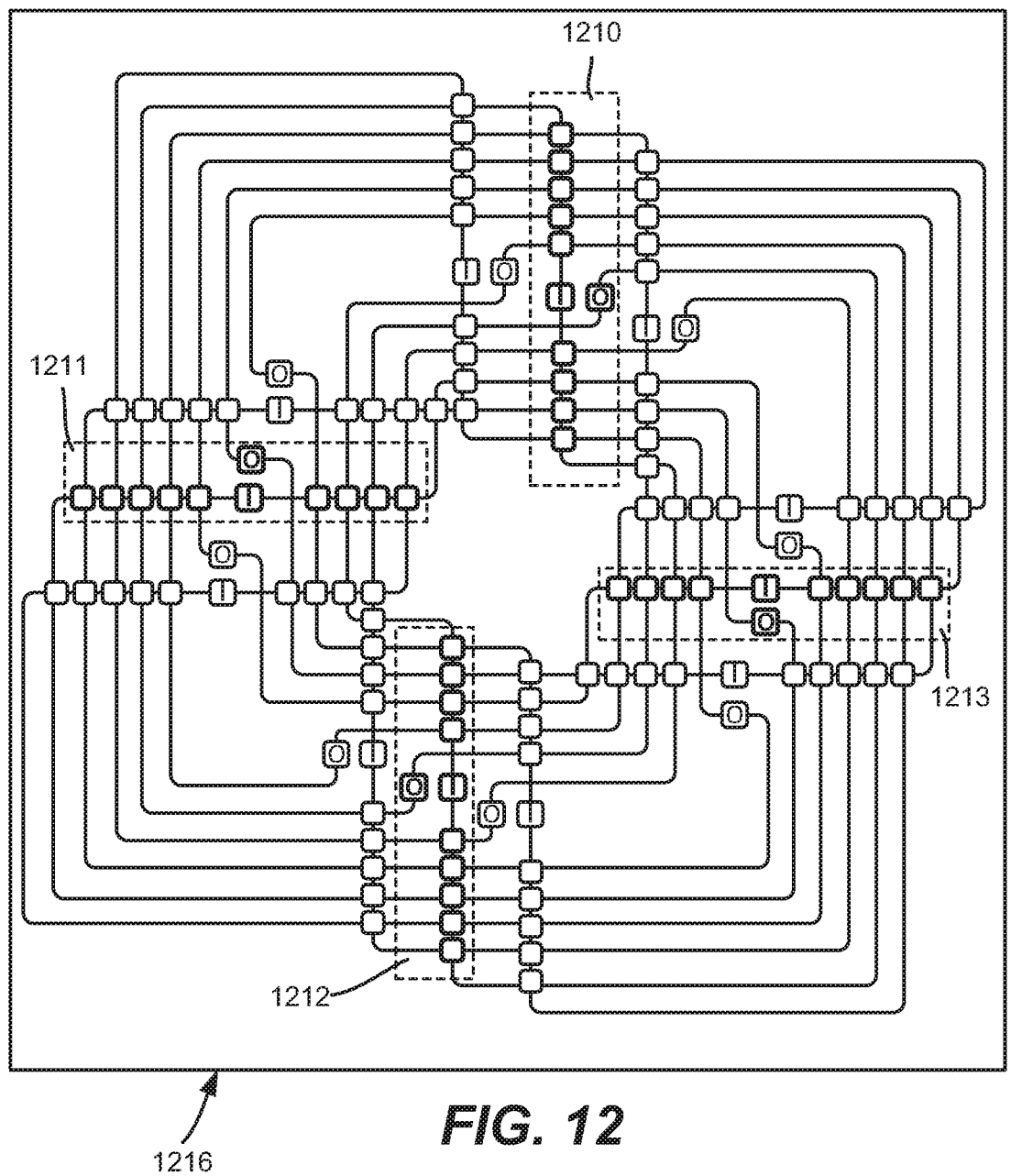
FIG. 12 is an example representation of the topology of a 12-port optical network of a non-blocking integrated optical switching fabric, demonstrating insertion of clusters and an increase in optical switching elements to increase a number of ports, according to one or more example implementations.
Figure 13:
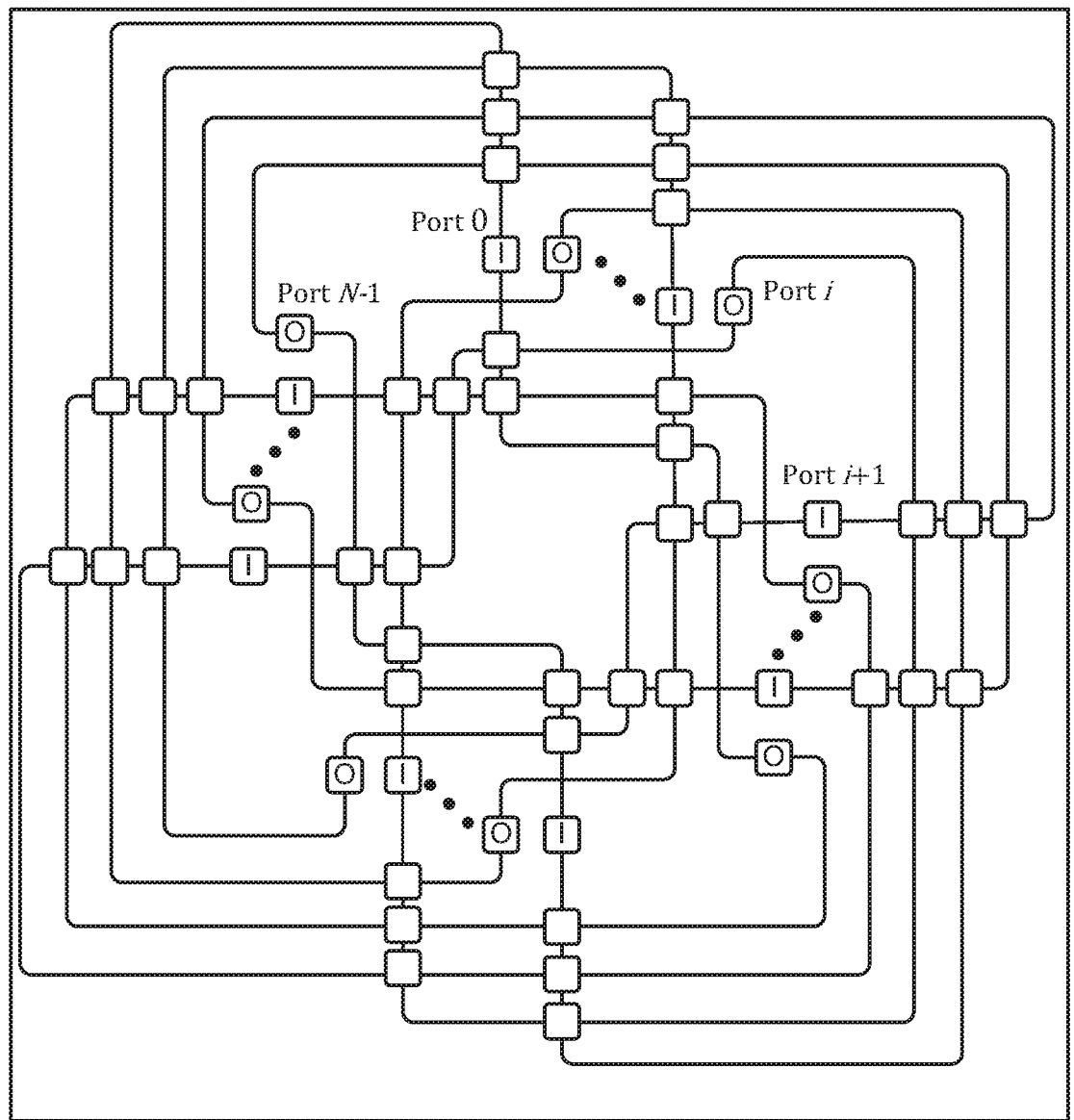
FIG. 13 is an example representation of the topology of an N-port optical network of a non-blocking integrated optical switching fabric using one or more microresonators as optical switching elements, and demonstrating a port numbering scheme, according to one or more example implementations.

Turning to aspects related to extensibility, FIGS. 8 and 11 show 8-port optical networks 816 and 1116, respectively. Relative to the 6-port optical network, FIG. 11 shows how two input-output clusters (the dashed blocks 1110 and 1111 with bolded cluster components) may be inserted between two adjacent input-output clusters to provide the an 8-port optical network 1116. Note that although not shown, it is understood that one input-output cluster may be added to provide a 7-port optical network. Relative to the 8-port optical network, FIG. 12 shows how four input-output clusters (the dashed blocks 1210, 1211, 1212 and 1213 with bolded cluster components) may be inserted between two adjacent input-output clusters to provide an 8-port optical network 1216. Again, inserting one input-output cluster provides a 9-port optical network, two input-output clusters a 10-port optical network, and so on. Indeed, insert any number of input-output clusters may be inserted to extend the topology to a generic N-port optical network 1316 as shown in FIG. 13.

To increase the total number of ports in an optical network, a related increase in the number of optical switching elements is needed. For example, it can be seen that the 6-port optical network 216 (FIG. 2) has three optical switching elements per cluster, the 8-port optical network 1116 (FIG. 11) has five optical switching elements per cluster, the 12-port optical network 1216 (FIG. 12) has nine optical switching elements per cluster, and so on. More particularly, for a generic N-port optical network, each cluster comprises N−3 optical switching elements.

Note further that (N/2)−1 optical switching elements are associated with the outer loops and the remaining (N/2)−2 optical switching elements are associated with the inner loops. It also should be noted that using more than two crossbar-like "loops" to construct an optical switching network introduces more waveguide crossings and results in larger loss and crosstalk, because of the need to connect these crossbar-like "loops" with input and output blocks by passing at least one crossbar-like "loop" in a planar optical circuit.

Figure 14:
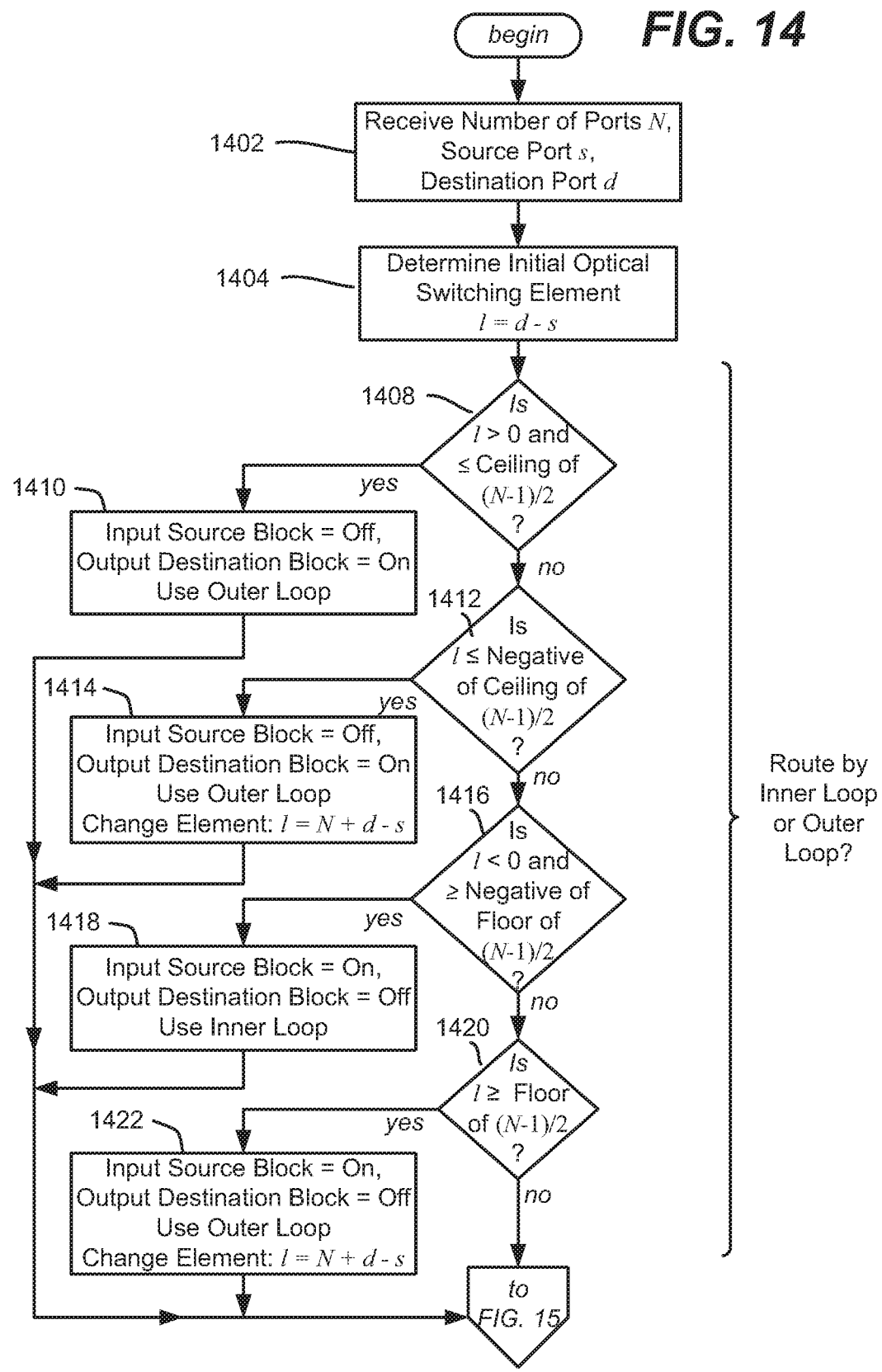
FIGS. 14 and 15 comprise a flow diagram directed towards operations of a routing controller to establish paths in a non-blocking integrated optical switching fabric, according to one or more example implementations.
Figure 15:
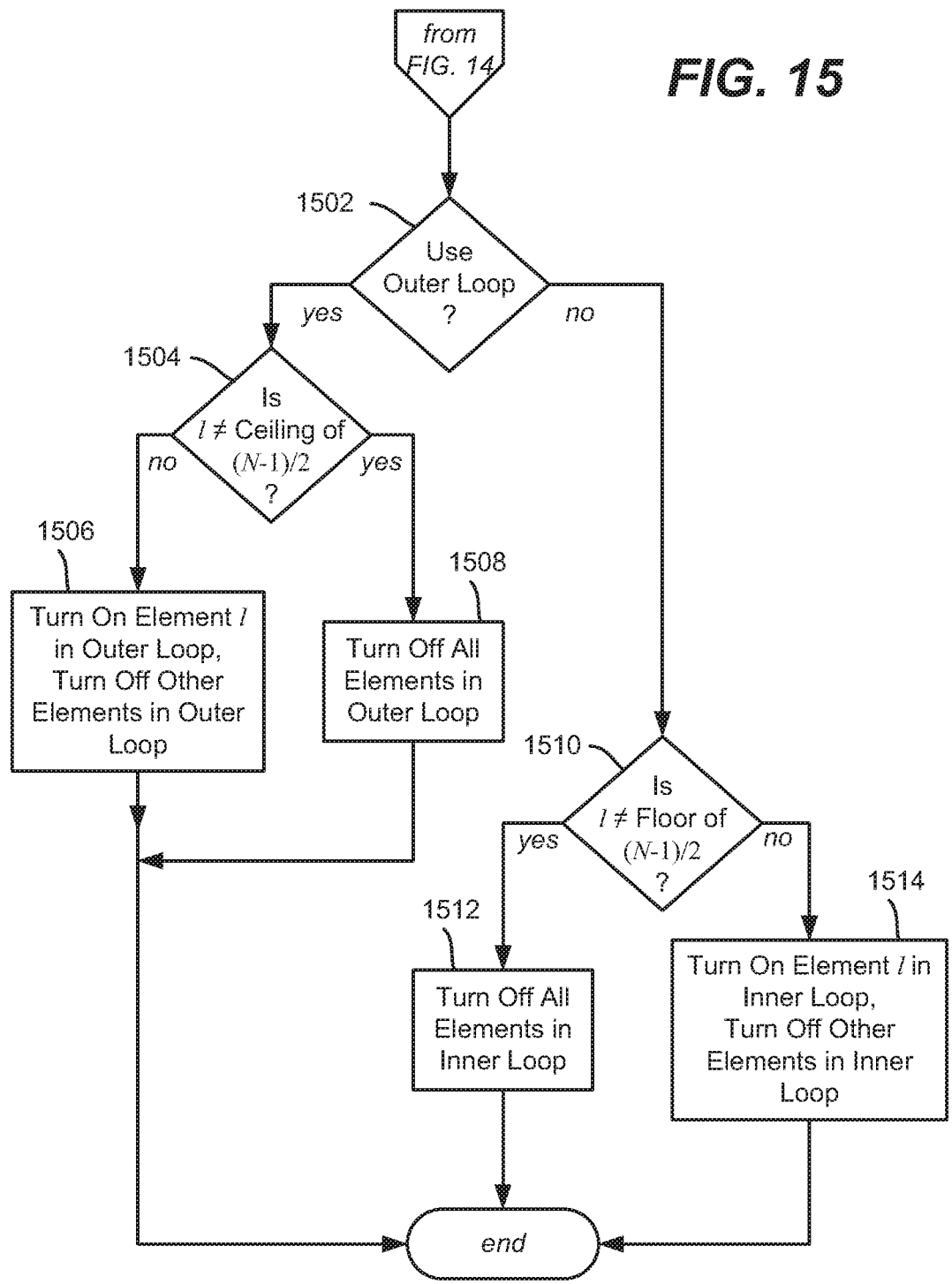

Turning to one suitable routing algorithm, because the optical network is an optical circuit switching fabric, a path has is established from a source input block to a destination output block based on a routing algorithm. Because in one or more implementations the available path between any input port and output port is unique within the network, only the control signals of the optical switching element, input block and output block along this path need to be determined to route the optical signal from the source to the destination correctly. The following algorithm, also described with reference to the example operations (exemplified as steps) of FIGS. 14 and 15, is one way that this may be done:

---

Input: The number N of the ports, source s and destination d
Output: Control signals of optical switching elements (OSEs), input block ($In_s$) and output block ($Out_d$)

```
 1:   l ← d − s
 2:   if 0 < l ≤ ⌈(N − 1)/2⌉ then
 3:       In_s ← off; Out_d ← on; Is_outer ← True;
 4:   else if l ≤ −⌈(N − 1)/2⌉ then
 5:       In_s ← off; Out_d ← on; Is_outer ← True;
          l ← N + d − s;
 6:   else if −⌊(N − 1)/2⌋ ≤ l < 0 then
 7:       In_s ← on; Out_d ← off; Is_outer ← False;
 8:   else if l ≥ ⌊(N − 1)/2⌋ then
 9:       In_s ← on; Out_d ← off; Is_outer ← False;
          l ← N + s − d;
10:   end if
11:   if Is_outer == True then
12:       if l ≠ ⌈(N − 1)/2⌉ then
13:           OSE_{l,s,d,outer} ← on; OSE_{others,s,d,outer} ← off;
14:       else
15:           OSE_{all,s,d,outer} ← off;
16:       end if
17:   else
18:       if l ≠ ⌊(N − 1)/2⌋ then
19:           OSE_{l,s,d,inner} ← on; OSE_{others,s,d,inner} ← off;
20:       else
21:           OSE_{all,s,d,inner} ← off;
22:       end if
23:   end if
```

---

Note that the algorithm is based upon the numeric identity of the source and destination, and thus to be correct, the numbering order needs to be consistent. In this example, for the above algorithm, the input block and output block at the topmost left are identified as port 0, with the port number increasing along the counterclockwise direction, (if viewed from above as for example in FIGS. 8 and 13; notwithstanding, a clockwise or other consistent numbering scheme is alternatively feasible). Further note that $In_s$ and $Out_d$ represent the input block of source s and output block of destination d, respectively, $SE_{l,s,d,inner}$ represents the l-th optical switching element away from s along the path from s to d in the inner loop ($OSE_{l,s,d,outer}$ is for the outer loop), $OSE_{others,s,d,inner}$ represents all the optical switching element except the l-th optical switching element away from s along the path from s to d in the inner loop ($OSE_{others,s,d,outer}$ is for the outer loop) (outer loop), $OSE_{all,s,d,inner}$ represents all the BOSEs in the inner loop ($OSE_{all,s,d,outer}$ is for the outer loop), and on or off represents the turn-on or turn-off signal, respectively, which for example in a microresonator-based network makes the microresonators on-resonant or off-resonant, respectively.

It should also be noted that the position of the input block relative to the output block is quite flexible. For example, the input block 0 may be to the right of to the output block 0 whereas the input block 1 may be to the left of the output block 1. Thus, the position of the input block and output block within one cluster is exchangeable.

To set up a path from an input port to output port, the routing controller needs to turn on at most one optical switching element in the input-output cluster of the source, and to also turn on either the input block or output block. At step 1402 of FIG. 14, the controller receives as input the source port s, destination port d and if the number of ports is variable (e.g., as opposed to hard-coded into a fabricated chip, for example), the number of ports N. Step 1402 determines an initial optical switching element value l, based on the port difference between the source s and destination d.

The above algorithm then determines whether the optical signal is to be routed by the inner loop or the outer loop, as shown from lines 2 to 10 in the algorithm, and steps 1408-1422 in FIG. 14. In general, these lines/steps also mathematically determine the control signals, that is, the on or off states of the relevant clusters' components. Note that the value of l may change, which occurs at either line 5 (step 1414) or line 9 (step 1422) if those lines/steps are executed.

In general, if the signal needs to access the outer loop of the optical network (Is_outer=True), the controller sets the microresonators off-resonant in the input block of the source and the microresonators on-resonant in the output block of the destination. Otherwise, the controller turns on the microresonators in the input block of the source and turns off the microresonators in the output block of the destination to use the inner loop to route the optical signal.

From lines 11-23 of Algorithm 1, corresponding to steps 1502-1514 of FIG. 15, the routing controller determines the state of the optical switching elements along the unique path from the source to the destination. Steps 1504, 1506 and 1508 are for the outer loop, while steps 1510, 1512 and 1514 are for the inner loop. Note that via step 1504 (outer loop) or step 1510 (inner loop), to route the optical signal by the longest path, no optical switching element needs to be turned on (step 1508 outer, step 1512 inner). Otherwise, the controller turns on an optical switching element based on the distance between the source and destination, and turns off the rest of the optical switching elements along the path from the source to the destination (step 1510 outer, step 1514 inner).

By way of example, to route the optical signal from input port 0 to output port 4 in the 8-port optical network 816 of FIG. 8, marked as the bold dashed line, there is no need to turn on any optical switching element (the single microresonator) along the path connecting input port 0 and output port 4. To route the optical signal from input port 1 to output port 7, marked as the bold solid line in FIG. 8, the controller uses the inner loop and turns on the optical switching element 880 (marked with an "X" in FIG. 8 and turns off other optical switching element along this path according to lines 9 and 19 in Algorithm 1. Note that this process is somewhat similar to the routing algorithm of Crossbar if the outer loops and the inner loops of the optical network are considered similar to two Crossbar-like structures in a polar coordinate system.

Turning to another aspect, while the above algorithm is highly efficient and works for any N-port network with two loops, it is also feasible (at least for networks having relatively smaller numbers of ports) to run the algorithm in advance for all d and s values with any fixed number N (e.g., offline, before fabrication) and store the results in a data structure. For example, in FIG. 16, a routing controller 1606 receives s and d as input as before, but instead of dynamically running the algorithm (online), accesses an array data structure 1690 that stores the information needed to output the correct control signals for these two input source and destination values. Again, because N in this example is fixed at the time of fabrication, algorithm 1 above may be run offline before fabrication, with the control signals to output stored as results in an on-chip data structure for online lookup.

Figure 16:
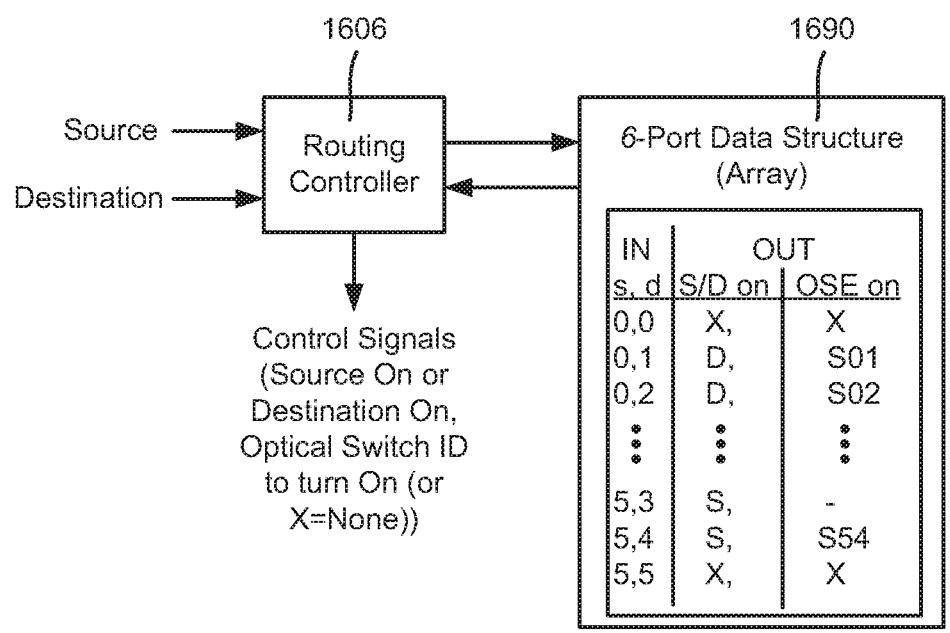
FIG. 16 is a representation of a routing controller accessing saved information to establish paths in a non-blocking integrated optical switching fabric, according to one or more example implementations.

For example, consider in the example of FIG. 16 that a 6-port optical switching fabric is to be fixed on chip. The number of ports N is thus fixed at six in this example, and the s values and d values range from zero (0) to five (5). An array 1690 may thus be used that stores for each valid input combination whether the input block is turned on (and if not, the output block is turned on), and the on state of any optical switching element (OSE) to be turned on (others are turned off). Note that the network needs to have its optical switching elements identified and mapped to by the controller in a suitable way, e.g., each may have a single different number in the entire network to uniquely identity each optical switching element therein (such as 0-18 in FIG. 2), or there may be a cluster (port) number, switching element within the cluster number pairing (C0, OSE0) to uniquely identify each optical switching element in the entire optical network. Further note that the idle state of the optical switching element is the off state. When there is no path established, all optical switching elements are in the off state. When a path is torn down, the optical switching elements along this path are turned off (that is, any relevant ones, including any previously turned on).

In the example of FIG. 16, for source 0, destination 1, the source (input block) is turned off, whereby the destination (output block) is turned on, and the optical switching element identified as S01 (labeled optical switching element 1034 in FIG. 2) is turned on. For source 0, destination 2, the source (input block) is turned off, whereby the destination (output block) is turned on, and the optical switching element identified as S02 (labeled optical switching element 1033 in FIG. 2) is turned on. Note that to establish the path from source s to destination d, the controller controls all of the optical switching elements within the source cluster. In the example of FIG. 16, therefore, the optical switching elements except S01 in cluster 0 are turned off for the source 0, destination 2 row of the 6-port data structure 1690.

For source 5, destination 3, the destination (output block) is turned off, whereby the source (input block) is turned on, and no optical switching element is turned on. Note that in the data structure 1690, the symbol "–" represents that all optical switching elements in that source cluster need to be turned off, and, for example, can be a value such as –1 in the array.

For source 5, destination 4, the destination (output block) is turned off, whereby the source (input block) is turned on, and the optical switching element identified as S54 (labeled optical switching element 1532 in FIG. 2) is turned on.

Note that an "X" in the data structure 1690 means not possible, that is, when the source and destination are in the same cluster. Indeed, in one or more implementations such rows may be removed from the array.

As can be seen, described herein is a strictly non-blocking optical switch fabric topology and routing algorithm that support bidirectional routing to accomplish ultra-high bandwidth and low latency intra-rack communication among tens or even hundreds of nodes with low power consumption; note that the strictly non-blocking property is formally provable). Further, relative to other fabrics, the technology described herein has significantly lower worst-case loss as well as lower average loss compared with Crossbar. For example, when 32 WDM channels are employed, the worst-case loss and average loss of a 128×128optical network is about 30 dB and 15 dB lower than those of a Crossbar (a unidirectional) fabric of the same size, respectively. Furthermore, compared to Crossbar, the optical switching fabric is less sensitive to the loss parameter of the devices.

One or more aspects are directed towards a strictly non-blocking optical circuit switching fabric comprising clusters, wherein each cluster of the clusters comprises an input block, an output block and optical switching elements. The input block of each cluster is capable of being coupled to the output block of each other cluster of the clusters via at least one loop of a plurality of loops. Aspects include a routing controller configured to control on and off states of a source input block of one cluster, a destination output block of another cluster and the optical switching elements to establish an optical signal path from the source input block to the destination output block. The routing controller is further configured to, based on a total number of ports of the strictly non-blocking optical circuit switching fabric and a source position of the source input block relative to a destination position of the destination output block, determine a selected loop from the source input block to the destination output block, turn on the source input block or turn on the destination output block based on the selected loop, and control an on state or an off state of each optical switching element of the optical switching elements that is on the selected loop to establish the optical signal path.

The plurality of loops may comprise inner loops and outer loops. The optical signal path from the source input block to the destination output block may be routed via one of the inner loops in one rotational direction, or is routed via one of the outer loops in an opposite rotational direction.

The routing controller may be configured to control respective on and off states of another input block of another cluster and another output block of a different other cluster and other optical switching elements to establish another at least partially simultaneous optical signal path between the other input block of the other cluster and the other output block of the different other cluster.

The source input block may comprise an optical pin that couples light into a waveguide. The destination output block may comprise an optical pin that receives light from a waveguide and couples the light into one or more optical fibers. At least some of the optical switching elements may comprise microresonators, and/or at least one of the optical switching elements may comprise a coupled-resonator optical waveguide. An optical switching element of the optical switching elements may comprise a microresonator group comprising microresonators, wherein each microresonator of the microresonators has a different resonant wavelength. At least some of the optical switching elements may comprise Mach-Zehnder interferometers.

The source position of the source input block relative to the destination position of the destination output block may be based on a sequential numbering of the clusters in one rotational direction. Within a cluster, the relative position of the input block may be to the right of the output block, or the relative position of the input block may be to the left of the output block.

The routing controller may be configured to access a data structure to determine at least one of: the selected loop from the source input block to the destination output block, whether to turn on the source input block or turn on the destination output block based on the selected loop, or whether to control respective on states or respective off states of each optical switching element of the optical switching elements that is on the selected loop.

One or more aspects are directed towards receiving, by a routing controller coupled to a strictly non-blocking optical circuit switching fabric, input comprising a source optical block and a destination optical block, the input requesting a coupling of the source input block to the destination output block to provide an optical signal path. Aspects include establishing, by the routing controller, the optical signal path from the source input block to the destination output block, comprising determining, based on a total number of ports of the strictly non-blocking optical circuit switching fabric and a first position of the source input block relative to a second position of the destination output block, a selected loop, whether to turn on the source input block or turn on the destination output block, and a respective on state or a respective off state of each optical switching element on the selected loop.

Receiving the input may comprise receiving the total number of ports. Determining the respective on state or the respective off state of each optical switching element may comprise controlling each optical switching element to the respective off state, or controlling one optical switching element to the respective on state and each other optical switching element to the respective off state.

Also described herein is establishing, by the routing controller, an at least partially simultaneous, different optical signal path between a different source input block and a different destination output block.

One or more aspects are directed towards operations of a routing mechanism of a strictly non-blocking integrated optical switching fabric, comprising determining, based on a total number of ports of the strictly non-blocking integrated optical switching fabric, a first value representing a source input block and a second value representing a destination output block, whether the source input block is routable to the destination output block via an inner loop or an outer loop of the strictly non-blocking integrated optical switching fabric. In response to the source input block being determined to be routable to the destination output block via the inner loop, described herein is determining, from the total number of ports, the first value and the second value, a first on or off state of the source input block, a second on or off state of the destination output block, and third respective on or off switch states of a first group of optical switching elements on the inner loop. Also described is, in response to the source input block being determined to be routable to the destination output block via the outer loop, determining, from the total number of ports, the first value and the second value, the first on or off state of the source input block, the second on or off state of the destination output block, and fourth respective on or off switch states of a second group of optical switching elements on the outer loop and outputting control signals corresponding to the first on or off state, and the second on or off state, and further corresponding to the third respective on and off states or the fourth respective on and off states, to route optical signals from the source input block to the destination output block.

The operations also may comprise, receiving the first value representing the source input block and the second value representing the destination output block. The control signals may be first control signals, and the operations may further comprise, outputting second control signals to at least partially simultaneously route other optical signals from a different source input block to another, different destination output block. Determining at least one of the first on or off state, the second on or off state, the third respective on and off states or the fourth respective on or off states may comprise accessing a data structure.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Accordingly, the invention is not to be limited to any single implementation, but rather is to be construed in breadth, spirit and scope in accordance with the appended claims.

What is claimed is:

1. A system, comprising:
   a strictly non-blocking optical circuit switching fabric comprising a plurality of loops and clusters, wherein each cluster of the clusters comprises an input block, an output block and optical switching elements, and wherein the input block of each cluster is capable of being coupled to the output block of each other cluster of the clusters via at least one loop of the plurality of loops; and
   a routing controller configured to control on and off states of a source input block of one cluster, a destination output block of another cluster and the optical switching elements of the cluster and the other cluster to establish an optical signal path from the source input block to the destination output block, wherein the routing controller is further configured to, based on a total number of ports of the strictly non-blocking optical circuit switching fabric and a source position of the source input block relative to a destination position of the destination output block:
   determine a selected loop of the plurality of loops from the source input block to the destination output block,
   turn on the source input block or turn on the destination output block based on the selected loop, and
   control an on state or an off state of each optical switching element of optical switching elements that are on the selected loop to establish the optical signal path.

2. The system of claim 1, wherein the plurality of loops comprises inner loops and outer loops.

3. The system of claim 2, wherein the optical signal path from the source input block to the destination output block is routed via one of the inner loops in one rotational direction, or is routed via one of the outer loops in an opposite rotational direction.

4. The system of claim 1, wherein the routing controller is configured to control respective on and off states of another input block of another cluster and another output block of a different other cluster and other optical switching elements to establish another at least partially simultaneous optical signal path between the other input block of the other cluster and the other output block of the different other cluster.

5. The system of claim 1 wherein the source input block comprises an optical pin that couples light into a waveguide, wherein the optical pin is one of a grating coupler or an edge coupler.

6. The system of claim 1 wherein the destination output block comprises an optical pin that receives light from a waveguide and couples the light into one or more optical fibers, wherein the optical pin is one of a grating coupler or an edge coupler.

7. The system of claim 1 wherein at least some of the optical switching elements of the clusters comprise microresonators, or wherein at least some of the optical switching elements of the clusters comprise Mach-Zehnder interferometers, or wherein at least some of the optical switching elements of the clusters comprise microresonators and wherein at least some of the optical switching elements of the clusters comprise Mach-Zehnder interferometers.

8. The system of claim 1 wherein at least one of the optical switching elements of the clusters comprises a coupled-resonator optical waveguide.

9. The system of claim 1 wherein an optical switching element of the optical switching elements of the clusters comprises a microresonator group comprising microresonators, and wherein each microresonator of the microresonators has a different resonant wavelength.

10. The system of claim 1 wherein the source position of the source input block relative to the destination position of the destination output block is based on a sequential numbering of the clusters in one rotational direction.

11. The system of claim 1 wherein within a cluster, a relative position of the input block is to a first side of the output block, or the relative position of the input block is to a second side of the output block.

12. The system of claim 1 wherein the routing controller is further configured to access a data structure to determine at least one of: the selected loop from the source input block to the destination output block, whether to turn on the source input block or turn on the destination output block based on the selected loop, or whether to control respective on states or respective off states of each optical switching element of the optical switching elements that is on the selected loop.

13. A method, comprising:
   receiving, by a routing controller coupled to a strictly non-blocking optical circuit switching fabric, input comprising a source optical block and a destination optical block, the input requesting a coupling of the source optical block to the destination optical block to provide an optical signal path, wherein the source optical block and the destination optical block comprise optical switching elements; and establishing, by the routing controller, the optical signal path from the source optical block to the destination optical block, comprising determining, based on a total number of ports of the strictly non-blocking optical circuit switching fabric and a first position of the source optical block relative to a second position of the destination optical block, a selected loop, whether to turn on the source optical block or turn on the destination optical block, and a respective on state or a respective off state of each optical switching element of the source optical block and the destination optical block on the selected loop.

14. The method of claim 13, wherein receiving the input comprises receiving the total number of ports.

15. The method of claim 13, wherein determining the respective on state or the respective off state of each optical switching element comprises controlling each optical switching element to the respective off state, or controlling one optical switching element to the respective on state and each other optical switching element to the respective off state.

16. The method of claim 13, further comprising, establishing, by the routing controller, an at least partially simultaneous, different optical signal path between a different source optical block and a different destination optical block.

17. A non-transitory machine-readable medium, comprising executable instructions that, when executed by a routing mechanism of a strictly non-blocking integrated optical switching fabric, facilitate performance of operations, comprising:

determining, based on a total number of ports of the strictly non-blocking integrated optical switching fabric, a first value representing a source input block and a second value representing a destination output block, whether the source input block is routable to the destination output block via an inner loop or an outer loop of the strictly non-blocking integrated optical switching fabric;

in response to the source input block being determined to be routable to the destination output block via the inner loop, determining, from the total number of ports, the first value and the second value, a first on or off state of the source input block, a second on or off state of the destination output block, and third respective on or off switch states of a first group of optical switching elements on the inner loop;

in response to the source input block being determined to be routable to the destination output block via the outer loop, determining, from the total number of ports, the first value and the second value, the first on or off state of the source input block, the second on or off state of the destination output block, and fourth respective on or off switch states of a second group of optical switching elements on the outer loop; and outputting control signals corresponding to the first on or off state, and the second on or off state, and further corresponding to the third respective on or off states or the fourth respective on or off states, to route optical signals from the source input block to the destination output block.

18. The non-transitory machine-readable medium of claim 17, wherein the operations further comprise, receiving the first value representing the source input block and the second value representing the destination output block.

19. The non-transitory machine-readable medium of claim 17, wherein the control signals are first control signals, and wherein the operations further comprise, outputting second control signals to at least partially simultaneously route other optical signals from a different source input block to another, different destination output block.

20. The non-transitory machine-readable medium of claim 17, wherein the determining at least one of the first on or off state, the second on or off state, the third respective on or off states or the fourth respective on or off states comprises accessing a data structure.

* * * * *